United States Patent [19]
Arndt

[11] Patent Number: 5,278,859
[45] Date of Patent: Jan. 11, 1994

[54] STRIPLINE LASER

[75] Inventor: Karlheinz Arndt, Munich, Fed. Rep. of Germany

[73] Assignee: Siemens Aktiengesellschaft, Munich, Fed. Rep. of Germany

[21] Appl. No.: 944,055

[22] Filed: Sep. 11, 1992

[30] Foreign Application Priority Data

Sep. 13, 1991 [DE] Fed. Rep. of Germany ....... 4130577

[51] Int. Cl.$^5$ ............................................. H01S 3/03
[52] U.S. Cl. ........................................ 372/64; 372/65; 372/87; 372/92; 372/98
[58] Field of Search .................. 372/64, 65, 87, 92, 372/95, 107, 98

[56] References Cited

U.S. PATENT DOCUMENTS

| 4,847,858 | 7/1989 | Brumme | 372/107 |
|---|---|---|---|
| 4,866,726 | 9/1989 | Ortiz et al. | 372/65 |
| 4,939,738 | 7/1990 | Opowem | 372/95 |
| 5,034,959 | 7/1991 | Welsch | 372/65 |
| 5,097,474 | 3/1992 | Welsch et al. | 372/65 |

FOREIGN PATENT DOCUMENTS

| 0521715 | 1/1993 | European Pat. Off. | 372/65 |
|---|---|---|---|
| 0095983 | 5/1985 | Japan | 372/65 |

Primary Examiner—Georgia Y. Epps
Attorney, Agent, or Firm—Herbert L. Lerner; Laurence A. Greenberg

[57] ABSTRACT

A stripline laser includes a housing having two sides. An exit window is disposed at one of the sides for a laser beam traveling in a given direction. Two metal electrodes are mutually spaced apart defining a discharge gap therebetween. At least two mutually parallel bars having very low coefficients of temperature expansion retain two resonator mirrors at a precisely fixed mutual spacing. The electrodes are rigidly joined to the housing and to the bars in the given direction at only one location in a reference plane. The electrodes are secured at another location against motions relative to the housing running perpendicular to the discharge gap. A holder adjustably fastens an inclination of at least one of the mirrors relative to the discharge gap. The bars fix an axial position and an angular position of the at least one adjustable mirror relative to the reference plane. The reference plane is disposed at least approximately midway between the mirrors.

7 Claims, 1 Drawing Sheet

STRIPLINE LASER

The present invention relates to a stripline or waveguide laser, including a housing, two metal electrodes between which a discharge gap is formed, two resonator mirrors, a beam exit window on one side, the mirrors being retained at a precisely fixed mutual spacing by at least two bars extending parallel to one another and having very low coefficients of temperature expansion, the electrodes being rigidly joined to the housing and the bars in the direction of the laser beam at only one location, a reference plane, and at another location being secured against motions relative to the housing that run at right angles to the discharge gap.

BACKGROUND OF THE INVENTION

Stripline or waveguide lasers are known from German Published, Non-Prosecuted Application DE 37 29 053 A1, corresponding to U.S. Pat. No. 4,939,738. The construction mentioned above is described in Published European Application No. 0 477 865. There, bars with very low temperature expansion coefficients are rigidly fastened to two opposed end walls of a laser housing; the electrodes are also rigidly fastened to one end wall, the reference plane, while in contrast on the opposite end wall they are held movably in the direction of the discharge gap by one or more alignment pins.

SUMMARY OF THE INVENTION

It is accordingly an object of the invention to provide a stripline laser, which overcomes the hereinafore-mentioned disadvantages of the heretofore-known devices of this general type and which further increases the positional stability of the beam at little effort or expense and with a low weight of the laser.

With the foregoing and other objects in view there is provided, in accordance with the invention, a stripline laser, comprising a housing having two sides, an exit window at one of the sides for a laser beam traveling in a given direction, two metal electrodes being mutually spaced apart defining a discharge gap therebetween, two resonator mirrors, at least two mutually parallel bars having very low coefficients of temperature expansion for retaining the mirrors at a precisely fixed mutual spacing, the electrodes being rigidly joined to the housing and to the bars in the given direction at only one location in a reference plane, and the electrodes being secured at another location against motions relative to the housing running perpendicular to the discharge gap, a holder adjustably fastening an inclination of at least one of the mirrors relative to the discharge gap, the bars fixing an axial position and an angular position of the at least one adjustable mirror relative to the reference plane, and the reference plane being disposed at least approximately midway between the mirrors.

The invention is based on the recognition that unavoidable temperature differences between the top and bottom of the laser, which are due to heating during operation, cause curving of the bars, the housing and the end plates, and such curvature has a disruptive effect unless it is compensated for rapidly by a cooled housing wall or a housing wall that is made extremely thick for the sake of adequate heat conduction. An undefined deformation of the adjoining parts of the housing is brought about by the bars, since the bars keep individual points of the housing at a constant spacing, and the other parts twist around these points and also make the bars assume a curved shape. This deformation changes the position of the laser beam and has a particularly harmful effect if at least one mirror is to be fastened to the end wall. This latter provision is necessary if the mirror is to be adjustable. This is particularly true if the bars are fixed to one end wall. In contrast, if the reference plane is located in the center between the mirrors in accordance with the invention, then the effect occurs to a very much lesser extent, and the position of the mirrors relative to the discharge gap is maintained. The result is an increase in the constancy and in the attainable yield of laser light.

In accordance with another feature of the invention, the reference plane is defined by a fastening plate that is connected to the electrodes and, on at least one side, to bars that are made of a material with a very low coefficient of temperature expansion, and the bars are rigidly connected to at least one retaining plate for the mirrors but not to one end wall. With such a structure, the stabilization of the spacing between the reference plane and the mirror secured on the retaining plate can be adequate, especially when parts such as the mirror holder simulate the spacing between the reference plane and the other mirror, which is not kept constant, with a negative algebraic sign, and thus compensate for the change in length on one side with a corresponding change in length on the other side. However, a configuration of bars may also begin in both directions from the reference plane, so that two retaining plates are retained at a constant spacing with respect to the reference plane. A symmetrical deformation is then attained, which has a considerably less disruptive effect than a unilateral deformation in a version according to the prior art.

In accordance with a further feature of the invention, the bars each include one bending region of reduced cross section in the vicinity of a location where they are fastened to the fastening plate or the retaining plate. A further lessening of twisting and an improvement in positional accuracy are attained in this way. Twisting of the retaining plate and therefore tilting of the mirror are largely avoided as a result.

In accordance with an added feature of the invention, at least one of the electrodes is rigidly connected to a reinforcement plate which is supported against the fastening plate. Bending of the electrodes is thus prevented, and mechanical oscillation that could be transmitted to the electrodes in operation is suppressed.

In accordance with an additional feature of the invention, there is provided a fastening element in the vicinity of the fastening plate for fastening the laser in a holder. As a result of this embodiment, the influences of external oscillation and acceleration can be damped even further, since they engage the middle of the equipment, are propagated symmetrically, and as a result have a less disruptive effect.

In accordance with yet another feature of the invention, there is provided a readily adjustable embodiment in which the bars are disposed outside the housing on one side of the fastening plate; a retaining plate is mounted on their ends facing away from the fastening plate, and a mirror holder is mounted on the retaining plate; the mirror holder protrudes into the housing through a recess in one end wall; and a bellows is disposed between the end wall and the retaining plate, surrounding the recess and closing off the housing in a vacuum-tight manner. A change in length of the exposed part of the electrodes can then be compensated for by a corresponding change in length of the mirror holder, if the materials are suitably selected. The embodiment described above also has the advantage of permitting mirrors to be finely adjusted from the outside, and of damping mechanical oscillation of the housing or retaining plate by the bellows. Oscillations are disruptive because they affect the laser power on one hand and on the other hand they have a disadvantageous effect on the positional stability of the beam.

In accordance with a concomitant feature of the invention, there is provided a further advantageous embodiment in which bars border the fastening plate on both sides in the interior of the housing; retaining plates are mounted on each side on the ends of the bars located away from the retaining plate; the retaining plates carry the mirrors; one of the retaining plates has a beam passage opening that is in alignment with a beam exit window in the closest end wall of the housing in the beam direction; and damping elements damping mechanical oscillation are disposed between the end walls and the closest retaining plates.

Other features which are considered as characteristic for the invention are set forth in the appended claims.

Although the invention is illustrated and described herein as embodied in a stripline laser, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
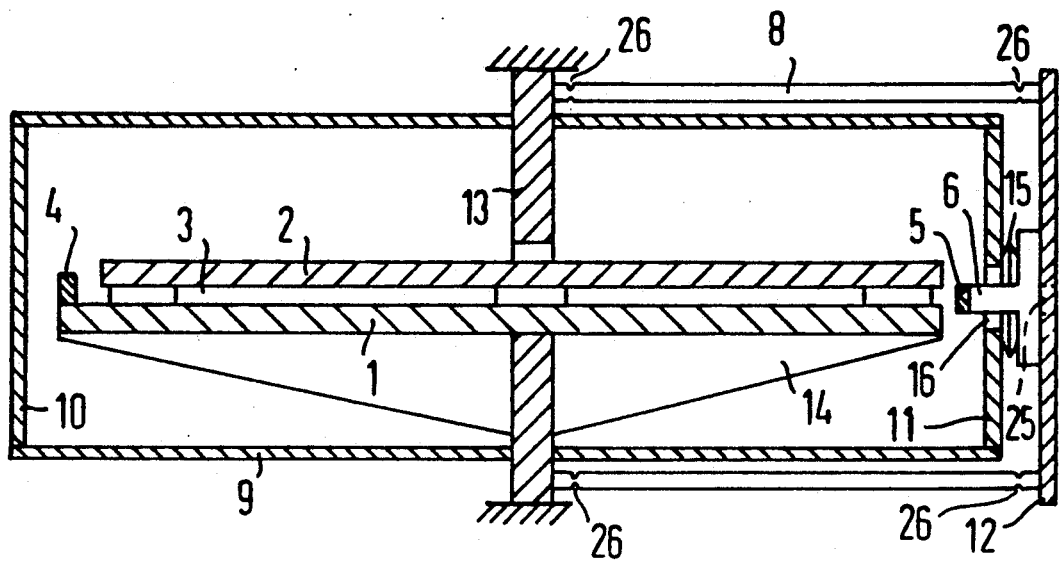
FIGS. 1 and 2 are fragmentary, diagrammatic, longitudinal-sectional views of lasers according to the invention.

Referring now to the figures of the drawing in detail and first, particularly, to FIG. 1 thereof, there are seen electrodes 1 and 2 which define a discharge gap 3 of a stripline or waveguide laser. A first resonator mirror 4 is disposed on the electrode 1, while a second resonator mirror 5 is secured to a mirror holder 6, which protrudes into a housing 9 through a recess 16 in one end wall 11 of the housing. The housing also has an opposite end wall 10. The mirror holder 6 is secured to a retaining plate 12. A bellows 15 surrounds the recess 16 and furnishes a vacuum-tight connection between the end wall 11 and the retaining plate 12 and thus seals off the laser. The retaining plate 12 is connected by bars 8 with a very low temperature expansion coefficient to a fastening plate 13, which in this case forms one part of the housing, protrudes into it, and carries the electrodes 1 and 2 that are firmly connected to one another mechanically. The bars 8 have bending regions 26 on both ends, as a result of which improved parallel guidance of the retaining plate 12 is attained. A reinforcement plate 14 stiffens the electrode 1 and is simultaneously supported against the fastening plate 13, assuring a stable structure which does not undergo any impermissible deformation even under strain from acceleration.

Through the use of a suitable selection of materials, a change in length of the electrodes 1, 2 caused by temperature fluctuations can be compensated for by a corresponding change in length of the holder 6, so that the spacing between the resonator mirrors 4 and 5 remains constant.

The recess 16 in the end wall 11 has a larger diameter than the holder 6, so that bending or oscillation of the housing 9 cannot be transmitted to the mirror.

A non-illustrated beam exit window is located behind the mirror holder 6. A beam passage opening 25 in the retaining plate 12 is aligned with the beam exit window.

Figure 2:
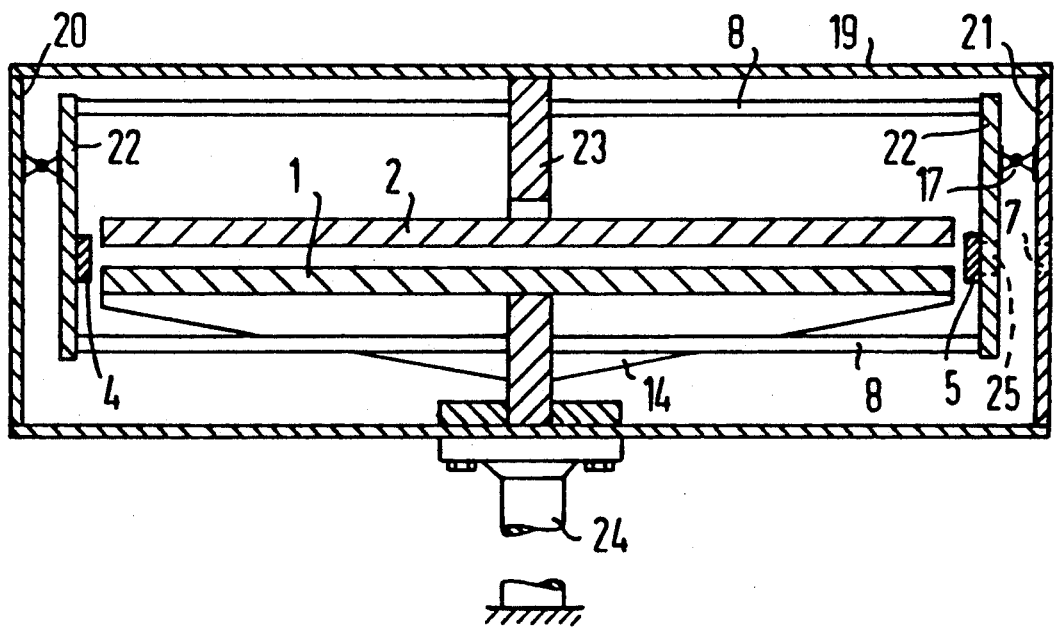

FIG. 2 shows a laser housing 19, in which a fastening plate 23 is built in. A reference plane for the fixation of the mirrors 4, 5 relative to the electrodes 1, 2 is located in the fastening plate 23. Bars 8 border the fastening plate 23 laterally and preferably at least four bars are used. Retaining plates 22 which carry the mirrors 4 and 5 are mounted on ends of the bars 8 facing away from the fastening plate. Damping members 17 are disposed between the retaining plates 22 and end walls 20, 21 of the housing 19, in order to damp relative motions between the end walls and the retaining plates and thereby avoid oscillation. The beam passage opening 25 in the retaining plate 22 is aligned with a beam exit window 7.

A fastening element 24 used for mounting the laser is disposed outside the housing 19, in the vicinity of the fastening plate 23. The fully symmetrical configuration described herein is especially suitable for use on high-speed swivel arms, since no asymmetrical strain on the laser that could cause damage to the laser occurs when mounting or retaining in the region of the fastening plate.

I claim:

1. A stripline laser, comprising a housing having two sides, an exit window at one of said sides for a laser beam traveling in a given direction, two metal electrodes being mutually spaced apart defining a discharge gap therebetween, two resonator mirrors, at least two mutually parallel bars having very low coefficients of temperature expansion for retaining said mirrors at a precisely fixed mutual spacing, said electrodes being rigidly joined to said housing and to said bars in the given direction at only one location in a reference plane, and said electrodes being secured at another location against motions relative to said housing running perpendicular to said discharge gap, a holder adjustably fastening an inclination of at least one of said mirrors relative to said discharge gap, said bars fixing an axial position and an angular position of said at least one adjustable mirror relative to said reference plane, and said reference plane being disposed at least approximately midway between said mirrors.

2. The stripline laser according to claim 1, including a fastening plate defining said reference plane, said fastening plate being rigidly connected to said electrodes and having at least one side connected to said bars, at least one retaining plate for at least one of said mirrors, and end walls of said housing, said bars being rigidly joined to said at least one retaining plate and being non-rigidly joined to at least one of said end walls of said housing.

3. The stripline laser according to claim 2, wherein said bars are fastened to said fastening plate and to said at least one retaining plate at given locations, and each of said bars have a bending region of reduced cross section in the vicinity of said given locations.

4. The stripline laser according to claim 2, including a reinforcement plate supported against said fastening plate, at least one of said electrodes being rigidly joined to said reinforcement plate.

5. The stripline laser according to claim 2, including a fastening element disposed in the vicinity of said fastening plate for an external holder of the laser.

6. The stripline laser according to claim 2, wherein said bars are disposed outside said housing on one side of said fastening plate, said at least one retaining plate is one retaining plate mounted on ends of said bars facing away from said fastening plate, said mirror holder is mounted on said retaining plate, said mirror holder protrudes into said housing through a recess formed in one of said end walls, and including a bellows disposed between said one end wall and said retaining plate for surrounding said recess and vacuum-tightly closing off said housing.

7. The stripline laser according to claim 2, wherein said bars are secured in the interior of said housing and border said fastening plate, said at least one retaining plate is in the form of two retaining plates mounted on ends of said bars facing away from each side of said fastening plate, said retaining plates carry said mirrors, one of said retaining plates has a beam passage opening formed therein being aligned in said given direction with said beam exit window in said end wall of said housing being closest to said beam passage opening, and including damping members disposed between said end walls and said retaining plates closest to said end walls for damping mechanical oscillation.

* * * * *